(12) United States Patent
Nakatsu

(10) Patent No.: US 9,077,833 B2
(45) Date of Patent: Jul. 7, 2015

(54) SETTING CONTENT OF FUNCTION OF ELECTRONIC APPARATUS INCLUDING DISPLAY OPERATION PORTION

(71) Applicant: KYOCERA Document Solutions Inc., Osaka (JP)

(72) Inventor: Kenta Nakatsu, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 13/865,900

(22) Filed: Apr. 18, 2013

(65) Prior Publication Data

US 2013/0278961 A1  Oct. 24, 2013

(30) Foreign Application Priority Data

Apr. 23, 2012 (JP) .................................. 2012-097691
Jan. 21, 2013 (JP) .................................. 2013-008088

(51) Int. Cl.
*H04N 1/00* (2006.01)
*G06F 3/0488* (2013.01)

(52) U.S. Cl.
CPC .......... *H04N 1/00474* (2013.01); *G06F 3/0488* (2013.01)

(58) Field of Classification Search
None
See application file for complete search history.

(56) References Cited

U.S. PATENT DOCUMENTS

| 2003/0020760 | A1 | 1/2003 | Takatsu et al. |
| 2005/0231520 | A1* | 10/2005 | Forest ........................... 345/581 |
| 2008/0055646 | A1* | 3/2008 | Kawabata .................... 358/1.16 |
| 2009/0122326 | A1* | 5/2009 | Chiba et al. .................... 358/1.9 |
| 2011/0181900 | A1* | 7/2011 | Suese ........................... 358/1.13 |

FOREIGN PATENT DOCUMENTS

JP  2003084965 A  3/2003

* cited by examiner

*Primary Examiner* — King Poon
*Assistant Examiner* — Andrew H Lam
(74) *Attorney, Agent, or Firm* — Alleman Hall McCoy Russell & Tuttle LLP

(57) ABSTRACT

Display operation portion of electronic apparatus includes screen on which information is displayed, and accepts touching operation. Control portion executes predetermined function. Option image display portion treats, as one set, plurality of option images corresponding to plurality of options that can be setting content of function, and displays one set of option images on screen so as to be arranged along first direction set in advance on screen. Selecting operation accepting portion accepts selecting operation of selecting one of plurality of option images. Determining operation accepting portion accepts determining operation of moving selected option image from display position of one set of option images to determination area which is provided, on screen, separately from display position in second direction different from first direction. Function setting determining portion performs determination processing of determining, as setting content of function, option corresponding to option image moved to determination area by determining operation.

15 Claims, 13 Drawing Sheets

SETTING CONTENT OF FUNCTION OF ELECTRONIC APPARATUS INCLUDING DISPLAY OPERATION PORTION

INCORPORATION BY REFERENCE

This application is based upon and claims the benefit of priority from the corresponding Japanese Patent Application No. 2012-097691 filed on Apr. 23, 2012, and No. 2013-008088 filed on Jan. 21, 2013, the entire contents of which are incorporated herein by reference.

BACKGROUND

The present disclosure relates to an electronic apparatus including display portion and an image forming apparatus including display portion, and particularly, to a technique of operations to select the setting content of a function.

In order to execute a variety of functions provided on an electronic apparatus, a user needs to perform an input operation of the setting content of each function. Regarding the input operation, for example, a technique is known that displays an operation screen for performing an input operation of the setting content of a function while switching the operation screen in accordance with a hierarchic level of each function a plurality of times, thereby allowing a user to perform an input operation of the setting content of each function in an orderly sequence.

In the above technique, since necessary setting contents are different among functions, the number or the placement of screen components such as check boxes for selecting one of a plurality of options that can be the setting content is different among respective operation screens for performing input operations of the setting contents of the functions. In addition, the number of operation screens to be switched and displayed is also different. Therefore, for example, users that are not used to the input operations, such as an elderly person, a hearing-impaired person, and a user that rarely uses an electronic apparatus, are likely to perform erroneous input operations when inputting the setting content of a function different from a desired function. In addition, it takes time to find a screen component for inputting a desired setting content on an operation screen.

SUMMARY

An electronic apparatus according to one aspect of the present disclosure includes a display operation portion, a control portion, an option image display portion, a selecting operation accepting portion, a determining operation accepting portion, and a function setting determining portion. The display operation portion includes a screen on which information is displayed, and accepts a touching operation on the screen. The control portion executes a predetermined function. The option image display portion treats, as one set, a plurality of option images corresponding to a plurality of options that can be the setting content of the function, and displays the one set of option images on the screen so as to be arranged along a first direction set in advance on the screen. The selecting operation accepting portion accepts a selecting operation of selecting one of the plurality of option images. The determining operation accepting portion accepts a determining operation of moving the option image selected by the selecting operation from a display position of the one set of option images to a determination area which is provided, on the screen, separately from the display position in a second direction different from the first direction. The function setting determining portion, when the determining operation accepting portion has accepted the determining operation, performs determination processing of determining, as the setting content of the function, an option corresponding to the option image moved to the determination area by the determining operation.

In addition, an image forming apparatus according to another aspect of the present disclosure includes an image forming portion, a display operation portion, a control portion, an option image display portion, a selecting operation accepting portion, a determining operation accepting portion, and a function setting determining portion. The image forming portion forms an image on a paper sheet. The display operation portion includes a screen on which information is displayed, and accepts a touching operation on the screen. The control portion executes a predetermined function including a function of causing the image forming portion to form an image on a paper sheet. The option image display portion treats, as one set, a plurality of option images corresponding to a plurality of options that can be the setting content of the function, and displays the one set of option images on the screen so as to be arranged along a first direction set in advance on the screen. The selecting operation accepting portion accepts a selecting operation of selecting one of the plurality of option images. The determining operation accepting portion accepts a determining operation of moving the option image selected by the selecting operation from a display position of the one set of option images to a determination area which is provided, on the screen, separately from the display position in a second direction different from the first direction. The function setting determining portion, when the determining operation accepting portion has accepted the determining operation, performs determination processing of determining, as the setting content of the function, an option corresponding to the option image moved to the determination area by the determining operation.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
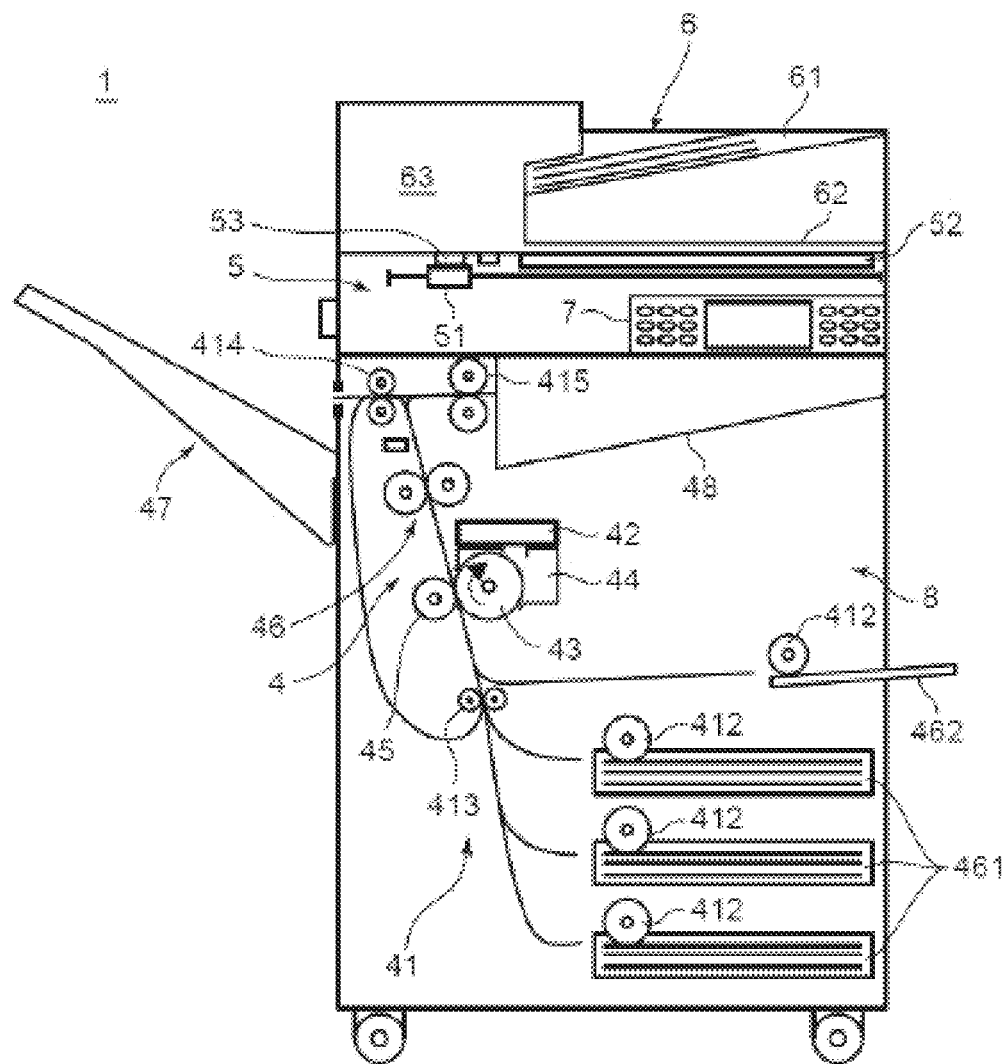
FIG. 1 is a schematic structure diagram of a multifunction peripheral as an example of an image forming apparatus, according to an embodiment of the present disclosure.

Hereinafter, embodiments according to the present disclosure will be described based on the drawings. FIG. 1 is a schematic structure diagram of a multifunction peripheral 1 as an example of an image forming apparatus according to the present disclosure.

As shown in FIG. 1, the multifunction peripheral 1 includes a document reading portion 5, a document sheet feed portion 6, a body portion 8, and an operation portion 7.

The document reading portion 5 is provided above the body portion 8. The document reading portion 5 includes: a scanner portion 51 composed of an exposure lamp, a CCD (Charge Coupled Device), and the like; and a document sheet table 52 and a document reading slit 53 which are composed of a transparent material such as glass.

The scanner portion 51 is movable by a driving portion not shown. When reading a document sheet placed on the document sheet table 52, the scanner portion 51 is moved along the document surface so as to face to the document sheet table 52, thereby scanning an image of the document sheet, and outputs obtained image data to a control portion 10 described later. In addition, when reading a document sheet fed by the document sheet feed portion 6, the scanner portion 51 is moved to a position facing to the document reading slit 53, obtains an image of the document sheet via the document reading slit 53 in synchronization with the conveying operation of the document sheet by the document sheet feed portion 6, and outputs image data thereof to the control portion 10 described later.

The document sheet feed portion 6 is provided above the document reading portion 5. The document sheet feed portion 6 includes: a document sheet placement portion 61 for placing a document sheet thereon; a document sheet discharge portion 62 for discharging a document sheet whose image has been read; and a document sheet conveying mechanism 63 that feeds one by one a document sheet placed on the document sheet placement portion 61, conveys the document sheet to the position facing to the document reading slit 53, and discharges the document sheet to the document sheet discharge portion 62.

The body portion 8 includes: a plurality of sheet feed cassettes 461; sheet feed rollers 412 that feed one by one a paper sheet from the sheet feed cassettes 461 or a manual feed tray 462 and convey the paper sheet to an image forming portion 4; the image forming portion 4 that forms an image on the conveyed paper sheet; and a stack tray 47 and a discharge tray 48 that discharge the paper sheet having the image formed thereon.

The image forming portion 4 includes a paper sheet conveying portion 41, an optical scanning device 42, a photosensitive drum 43, a developing portion 44, a transfer portion 45, and a fixing portion 46.

The paper sheet conveying portion 41 is provided on a paper sheet conveying path in the image forming portion 4, and includes: a conveying roller 413 that feeds a paper sheet conveyed by the sheet feed roller 412 to the photosensitive drum 43; a conveying roller 414 that conveys a paper sheet to the stack tray 47; a conveying roller 415 that conveys a paper sheet to the discharge tray 48; and the like.

The optical scanning device 42 outputs laser light based on image data inputted to the control portion 10, and scans the photosensitive drum 43 with the laser light, thereby forming an electrostatic latent image on the photosensitive drum 43.

The developing portion 44 applies toner to the electrostatic latent image on the photosensitive drum 43, thereby forming a toner image. The transfer portion 45 transfers the toner image on the photosensitive drum 43, onto a paper sheet. The fixing portion 46 heats the paper sheet having the toner image transferred thereon, thereby fixing the toner image on the paper sheet.

Figure 2:
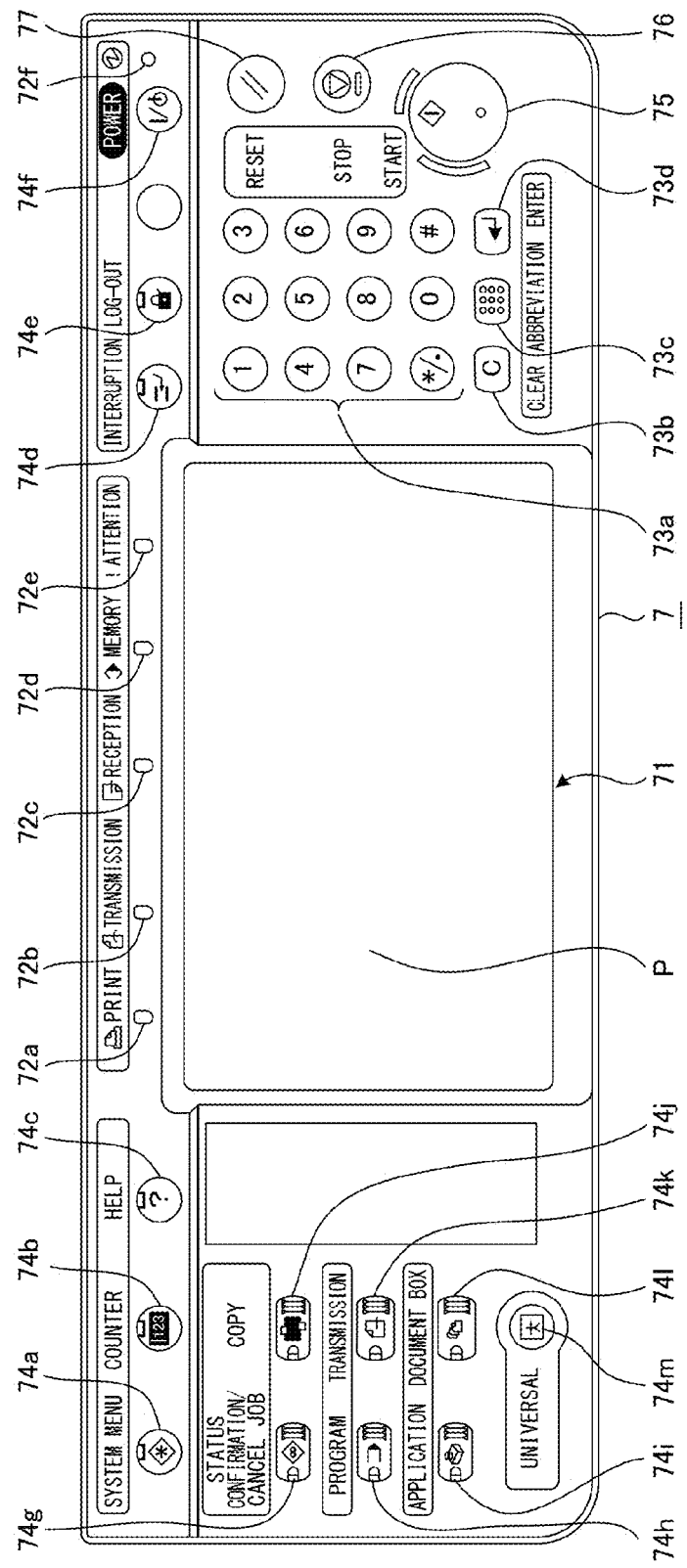
FIG. 2 is an explanation diagram showing an example of an operation portion, according to the embodiment of the present disclosure.

The operation portion 7 is provided at the front portion of the multifunction peripheral 1, and allows a user to input a variety of operation instructions. FIG. 2 is an explanation diagram showing an example of the operation portion 7. As shown in FIG. 2, the operation portion 7 has provided thereon a touch panel device 71, indicators 72a to 72f, input keys 73a to 73d, switches 74a to 74m, a start key 75, a stop key 76, and a reset key 77.

The touch panel device (display operation portion) 71 includes a liquid crystal display (screen) P having a touch panel function. When a software key displayed on the liquid crystal display P is touched by a user via the touch panel function, the touch panel device 71 accepts an instruction of a pressing operation for the software key. In addition, by the touch panel function, the touch panel device 71 accepts, as an instruction of a gesture operation, a trajectory of a position touched by a user on the liquid crystal display P. Based on trajectory information accepted by the touch panel device 71, the control portion 10 described later accepts the instruction of a gesture operation.

For example, the touch panel device 71 receives instructions of gesture operations such as: a tapping operation of lightly tapping the liquid crystal display P; a double tapping operation of performing the tapping operation two times within a predetermined acceptance time; a pinching operation of moving two fingers in a pinching manner on the liquid crystal display P or broadening the two fingers from the pinching state; a swiping operation of sliding a finger while touching the liquid crystal display P with the finger; and a flicking operation of moving a finger so as to lightly flick the liquid crystal display P.

The indicators 72a to 72f are each composed of a light emitting diode or the like. The indicators 72a to 72f each blink, light up, or are extinguished, thereby indicating the status of the multifunction peripheral 1. For example, the indicator 72a blinks during printing, the indicator 72b blinks during transmission of data to the outside, and the indicator 72c blinks during reception of data from the outside. The indicator 72d blinks when data stored in a hardware disk, a memory, or the like provided in the multifunction peripheral 1 is accessed. The indicator 72e lights up or blinks when an abnormal state occurs. The indicator 72f lights up when the multifunction peripheral 1 is being powered on.

The input keys 73a to 73d are provided for inputting a number or a symbol, or deleting or determining a character string that has been inputted. For example, the input key 73a is a so-called numeric key group, and is provided for inputting a number or a symbol. The input key 73b is a so-called clear key, and is provided for deleting a character string that has been inputted. The input key 73c is a so-called abbreviation key, and is provided for reading and inputting a character string stored in a memory or the like in advance. The input key 73d is a so-called enter key (return key), and is provided for determining an input instruction of a character string, a selecting instruction of a software key, or the like.

The switches 74a to 74m are used for switching each function provided on the multifunction peripheral 1. As a representative example, the switch 74j switches the function to a copy function of performing printing using image data read by the scanner portion 51, and displays, on the liquid crystal display P, an operation screen that allows a user to perform an input operation of the setting contents of a plurality of detailed functions relevant to the copy function. The switch 74k switches the function to a transmission function of transmitting image data read by the scanner portion 51 to the outside via the communication portion 9 described later, and displays, on the liquid crystal display P, an operation screen that allows a user to perform an input operation of the setting contents of a plurality of detailed functions relevant to the transmission function.

The start key 75 is provided for starting processing of each function. The stop key 76 is provided for stopping processing of each function. The reset key 77 is provided for returning the setting contents of each function to the initial state.

Figure 3:
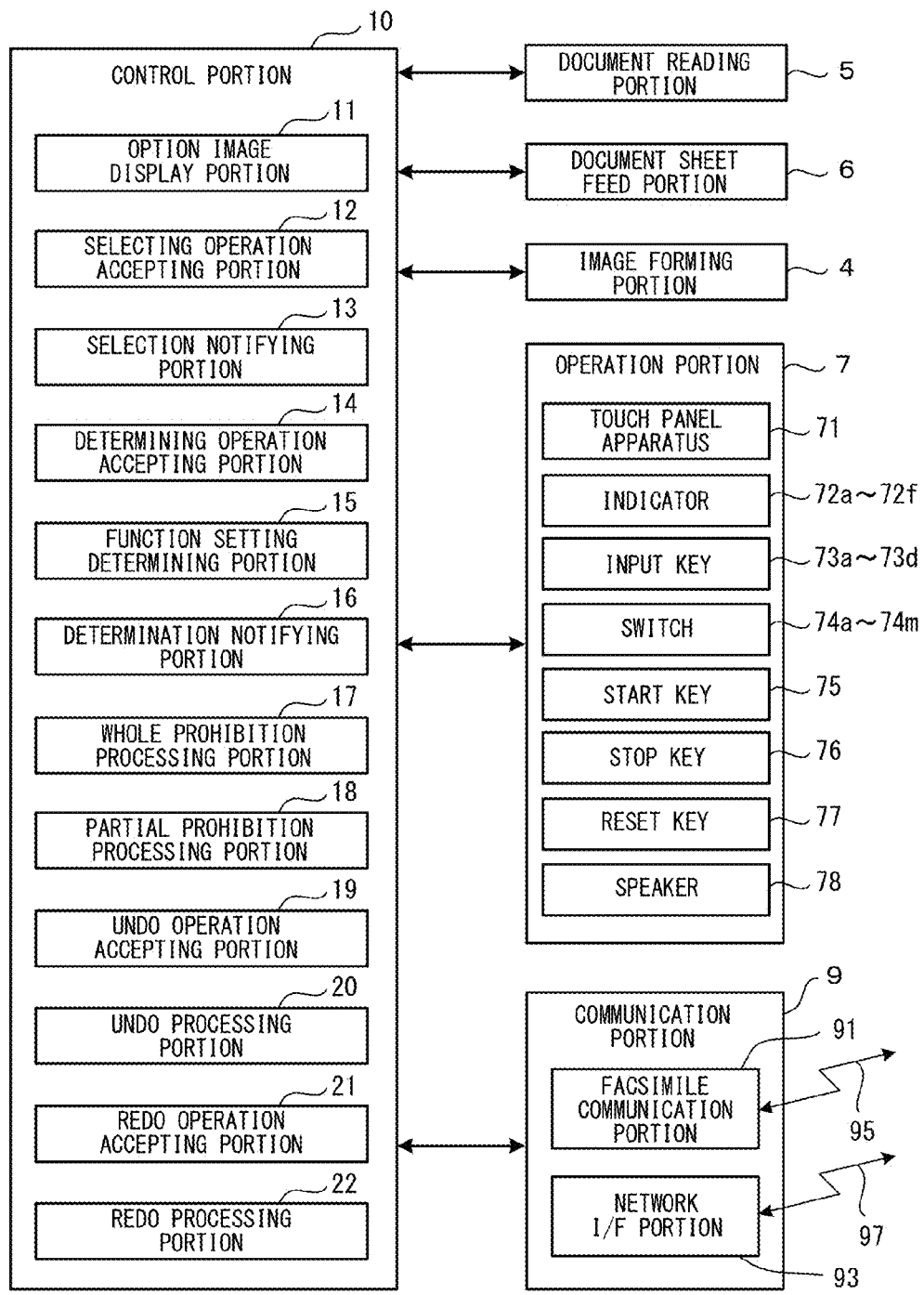
FIG. 3 is a block diagram showing an example of the electric configuration of the multifunction peripheral, according to the embodiment of the present disclosure.

FIG. 3 is a block diagram showing an example of the electric configuration of the multifunction peripheral 1. The multifunction peripheral 1 is connected to portions such as the document reading portion 5, the document sheet feed portion 6, the image forming portion 4, the operation portion 7, the communication portion 9, and the control portion 10, in a mutually communicable manner. The operation portion 7 includes a speaker 78, in addition to the above configuration shown in FIG. 2. Hereinafter, the description of the components denoted by the same reference characters as in FIGS. 1 and 2 will be omitted except for a matter to be specially described.

The speaker 78 is a device that outputs a predetermined sound signal in accordance with an instruction inputted from the control portion 10 described later.

The communication portion 9 includes a facsimile communication portion 91 and a network I/F portion 93. The facsimile communication portion 91 is connected to a telephone line 95. The facsimile communication portion 91 includes: an NCU (Network Control Unit) that controls connection of the telephone line to another facsimile; and a modulation/demodulation circuit that modulates or demodulates a signal for facsimile communication. The facsimile communication portion 91 transmits image data read by the document reading portion 5 to another facsimile apparatus via the telephone line 95, or receives image data transmitted from another facsimile apparatus and outputs the image data to the control portion 10.

The network I/F portion 93 is connected to a LAN (Local Area Network) 97. The network I/F portion 93 is a communication interface circuit for executing communication with a terminal apparatus such as a personal computer connected to the LAN 97. The network I/F portion 93 transmits image data read by the document reading portion 5 to an external computer such as a personal computer via the LAN 97, or receives image data transmitted from an external computer and outputs the image data to the control portion 10.

The control portion 10 includes, for example: a CPU (Central Processing Unit) that executes predetermined operational processing; a memory such as a ROM (Read Only Memory) having stored therein a predetermined control program or a RAM (Random Access Memory) that temporarily stores data; a storage medium such as an HDD (Hard Disk Drive) that stores various types of data such as image data; an ASIC (Application Specific Integrated Circuits) that is dedicated hardware capable of performing predetermined processing such as image processing at high speed; peripheral devices for the above components; and the like. The control portion 10 executes a control program stored in the ROM or the like by the CPU, thereby controlling the operation of each portion in the multifunction peripheral 1 and executing each function that can be executed on the multifunction peripheral 1. For example, the control portion 10 controls the operations of the scanner portion 51 and the image forming portion 4, thereby executing the copy function of causing the image forming portion 4 to form, on a paper sheet, an image represented by image data read by the scanner portion 51.

Regarding control for allowing a user to perform an input operation of the setting content of each function that can be executed on the multifunction peripheral 1, the control portion 10 functions as, in particular, an option image display portion 11, a selecting operation accepting portion 12, a selection notifying portion 13, a determining operation accepting portion 14, a function setting determining portion 15, a determination notifying portion 16, a whole prohibition processing portion 17, a partial prohibition processing portion 18, an undo operation accepting portion 19, an undo processing portion 20, a redo operation accepting portion 21, and a redo processing portion 22.

Figure 4:
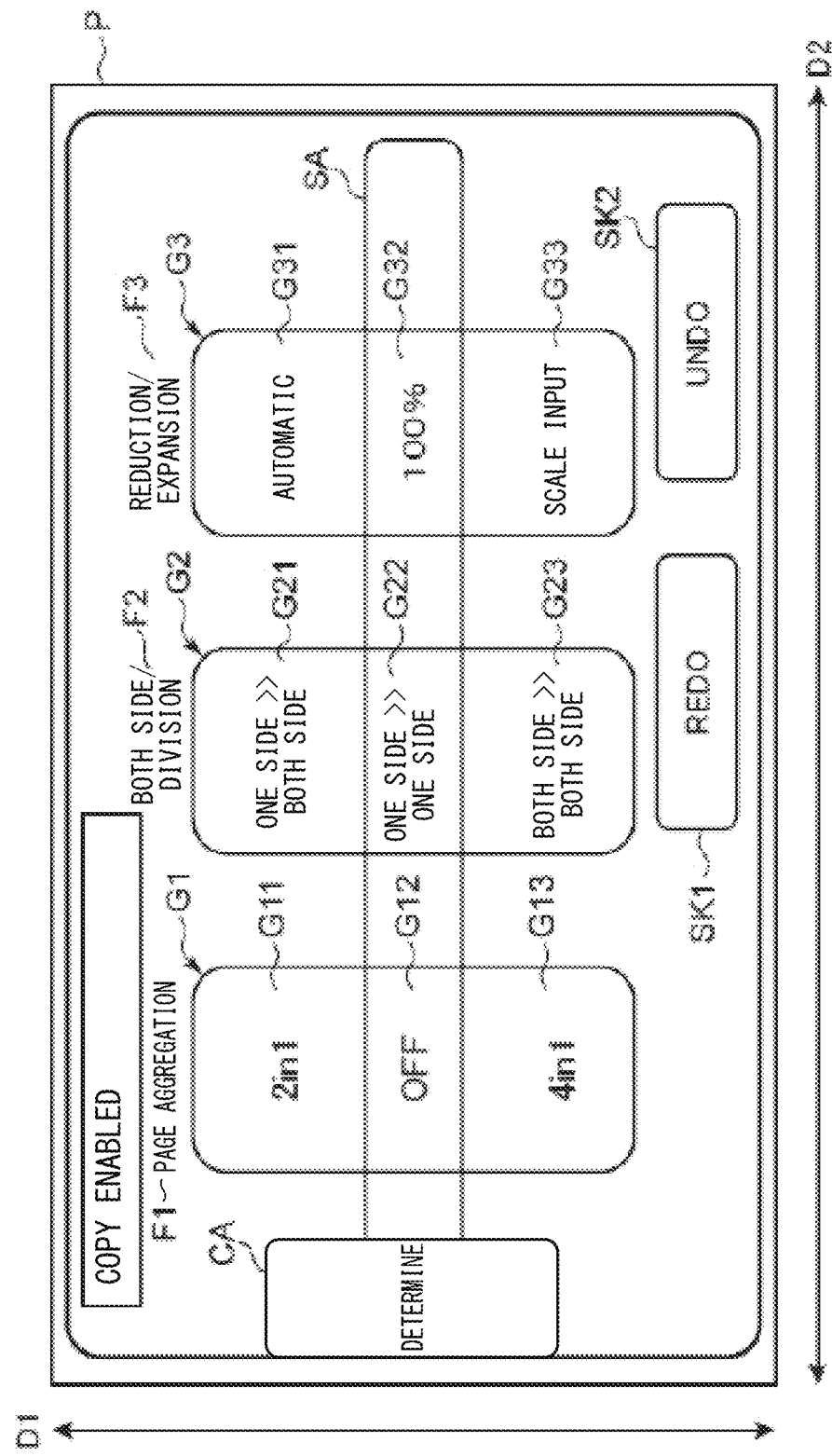
FIG. 4 is an explanation diagram showing an example of an operation screen that allows a user to perform an input operation of the setting content of each function, according to the embodiment of the present disclosure.

Hereinafter, with reference to FIG. 4, the summary of the portions 11 to 22 will be described. FIG. 4 is an explanation diagram showing an example of an operation screen that allows a user to perform an input operation of the setting content of each function.

The option image display portion 11, for example, as shown in FIG. 4, causes the liquid crystal display P to display an operation screen that allows a user to perform an input operation of the setting contents of a predetermined number of functions, here, three functions (a page aggregation function, a both side/division function, and a reduction/expansion function), among a plurality of detailed functions relevant to the copy function that can be executed by the control portion 10.

At this time, the option image display portion 11 treats, as one set, a plurality of option images respectively corresponding to a plurality of options that can be the setting content of each function, on a function-by-function basis. In addition, the option image display portion 11 displays, as one group, a predetermined number of option images among the one set of option images, so as to be arranged along the vertical direction (first direction) D1 of the liquid crystal display P.

For example, as shown in FIG. 4, the option image display portion 11 treats, as one set, a plurality of option images respectively corresponding to a plurality of options ("one side>>both side", "one side>>one side", "both side>>both side", "both side>>one side", and the like) that can be the setting content of the both side/division function. In addition, the option image display portion 11 displays a function image F2 indicating the both side/division function, and displays, for example, below the function image F2, a predetermined number of images, here, three option images G21 to G23 as one group G2 among the one set of option images, so as to be arranged along the vertical direction D1.

In addition, the option image display portion 11 displays a plurality of groups (a plurality of groups of option images, in FIG. 4, three groups G1 to G3) respectively corresponding to a predetermined number of functions (in FIG. 4, three functions), so as to be arranged along a horizontal direction (second direction) D2 of the liquid crystal display P.

The selecting operation accepting portion 12 accepts a selecting operation of selecting one of a plurality of option images G11 to G13, G21 to G23, and G31 to G33. Every time the selecting operation accepting portion 12 accepts a selecting operation, the selection notifying portion 13 causes the speaker 78 to output a predetermined sound indicating that a different option has been selected.

The determining operation accepting portion 14 accepts a determining operation of moving an option image selected by a selecting operation from the position of the group (G1 to G3) that includes the selected option image to a determination area CA provided separately from the position in the horizontal direction D2 on the liquid crystal display P.

When the determining operation accepting portion 14 has accepted a determining operation, the function setting determining portion 15 performs determination processing of determining, as the setting content of the function, an option corresponding to the option image moved to the determination area CA by the determining operation. Every time the determination processing is performed, the determination notifying portion 16 outputs a predetermined sound indicating that the setting content of the function has been determined.

The whole prohibition processing portion 17 prohibits displaying, on the liquid crystal display P, one set of option images corresponding to a function prohibited from being executed in combination with a function whose setting content has been determined by determination processing.

The partial prohibition processing portion 18 causes the liquid crystal display P to display, among the plurality of option images G11 to G13, G21 to G23, and G31 to G33, an option image corresponding to a setting content prohibited from being set in combination with a setting content determined by determination processing, in a display manner that allows a user to distinguish the option image from option images corresponding to setting contents that are not prohibited from being set in combination with the setting content determined by the determination processing.

The undo operation accepting portion 19 accepts an undo operation when an undo key SK2 is pressed, for example. When the undo operation accepting portion 19 has accepted an undo operation, the undo processing portion 20 performs undo processing of making disappear one set of option images displayed by post-determination processing upon the determination processing performed just before the acceptance, and displaying again, on the screen, one set of option images which has been made to disappear by the post-determination processing.

The redo operation accepting portion 21 accepts a redo operation when a redo key SK1 is pressed, for example. After the undo operation accepting portion 19 has accepted an undo operation, when the redo operation accepting portion 21 has accepted a redo operation, the redo processing portion 22 makes disappear one set of option images displayed again by the undo processing performed just before the acceptance of the redo operation, and displays again, on the liquid crystal display P, one set of option images which has been made to disappeared by the undo processing.

Figure 5:
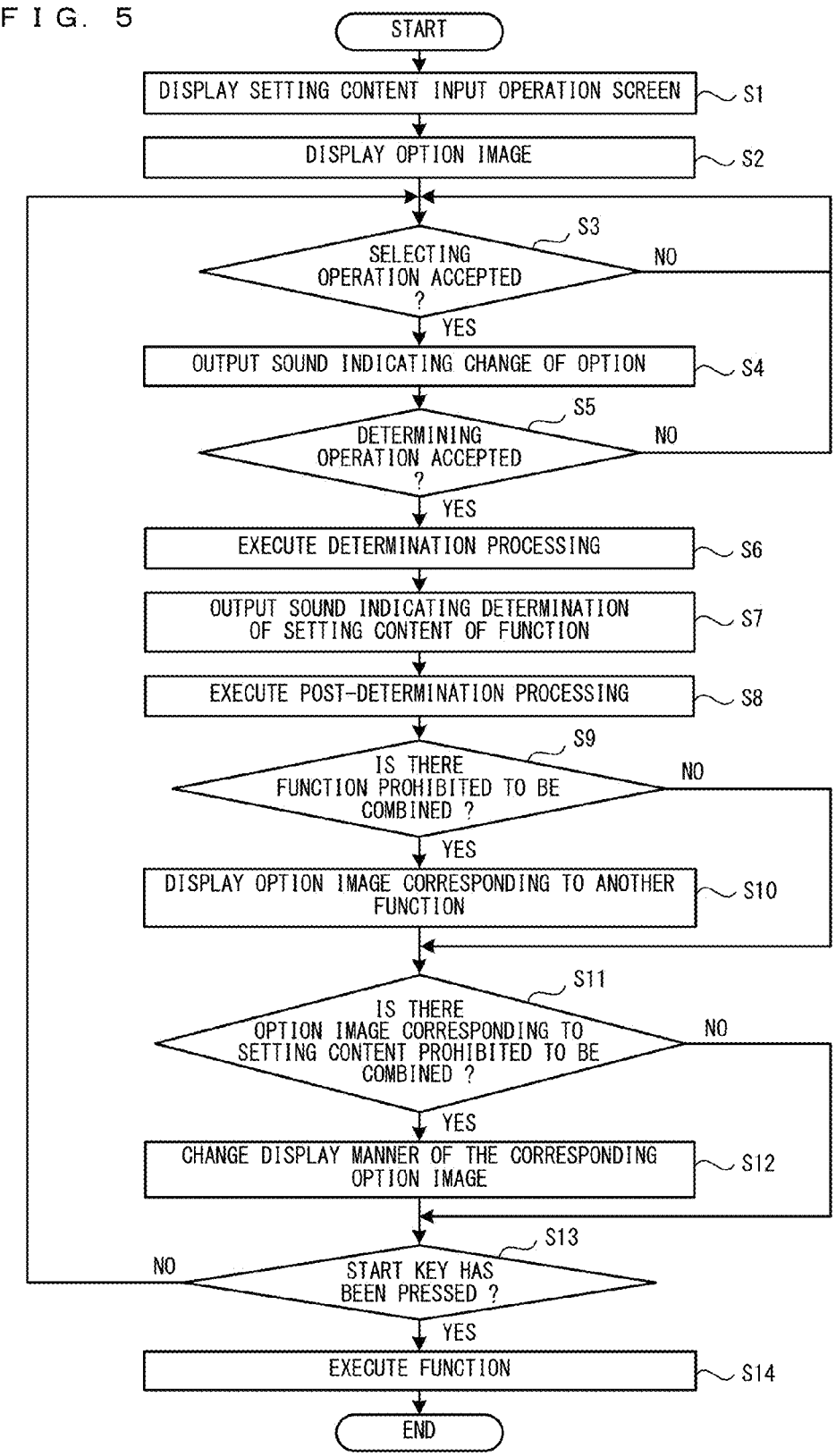
FIG. 5 is a flowchart showing an example of a process for allowing a user to perform an input operation of the setting content of each function, according to the embodiment of the present disclosure.

Hereinafter, with reference to FIGS. 4 to 10, a process performed by the above portions 11 to 22 for allowing a user to perform an input operation of the setting content of each function provided on the multifunction peripheral 1, will be described in detail. FIG. 5 is a flowchart showing an example of the process for allowing a user to perform an input operation of the setting content of each function.

For example, when the switch 74j (FIG. 2) provided on the operation portion 7 has been pressed, the option image display portion 11 causes, by the control portion 10, the liquid crystal display P to display an operation screen for allowing a user to perform an input operation of the setting contents of a predetermined number of functions, here, three functions relevant to the copy function, as shown in FIG. 4, for example (S1).

The option image display portion 11 treats, as one set, a plurality of option images respectively corresponding to a plurality of options that can be the setting content of each function, on a function-by-function basis, and displays, as one group, a predetermined number of option images among the one set of option images, so as to be arranged along the vertical direction D1 (S2).

Specifically, the option image display portion 11 treats, as one set, a plurality of option images respectively corresponding to a plurality of options ("2 in 1", "OFF", and "4 in 1") that can be the setting content of the page aggregation function, as shown in FIG. 4. Then, the option image display portion 11 displays a function image F1 indicating the page aggregation function, and displays, for example, below the function image F1, a predetermined number of option images, here, three option images G11 to G13 as one group G1 among the one set of option images, so as to be arranged along the vertical direction D1.

Similarly, the option image display portion 11 treats, as one set, a plurality of option images respectively corresponding to a plurality of options ("one side>>both side", "one side>>one side", "both side>>both side", "both side>>one side", and the like) that can be the setting content of the both side/division function. Then, the option image display portion 11 displays a function image F2 indicating the both side/division function, and displays, for example, below the function image F2, three option images G21 to G23 as one group G2 among the one set of option images, so as to be arranged along the vertical direction D1.

In addition, the option image display portion 11 treats, as one set, a plurality of option images respectively corresponding to a plurality of options ("automatic", "100%", "scale input", "A4→B4", "B4→A4", and the like) that can be the setting content of the reduction/expansion function. Then, the option image display portion 11 displays a function image F3 indicating the reduction/expansion function, and displays, for example, below the function image F3, three option images G31 to G33 as one group G3 among the one set of option images, so as to be arranged along the vertical direction D1.

Thus, among one set of option images, a predetermined number of option images are displayed so as to be arranged along the vertical direction D1. Therefore, the respective positions where the predetermined number of option images are displayed are substantially constant with respect to the vertical direction D1 of the liquid crystal display P. That is, since the positions where the option images are displayed are substantially constant, a user's labor for looking for an option image that is a desired selection target is reduced, thus providing a preferable effect for the user.

In addition, the option image display portion 11 displays a plurality of groups respectively corresponding to a predetermined number of functions so as to be arranged along the horizontal direction D2 of the liquid crystal display P. For example, in FIG. 4, the option image display portion 11 causes the liquid crystal display P to display three groups G1 to G3 respectively corresponding to the page aggregation function, the both side/division function, and the reduction/expansion function so as to be arranged along the horizontal direction D2.

It is noted that the predetermined function number is not limited to three as shown in FIG. 4, but may be one, for example. The predetermined function number is set as a design matter in advance in accordance with the screen size of the liquid crystal display P, and is stored in the ROM or the like.

For example, in the case of executing the copy function, besides the three functions of the page aggregation function, the both side/division function, and the reduction/expansion function, the setting contents of functions such as a density function and a sheet size function can be inputted. Thus, the number of target functions for which input operations of the setting contents are to be performed may exceed the predetermined function number described above.

In this case, for example, while one of the predetermined number of function images (in FIG. 4, F1 to F3) displayed on the liquid crystal display P keeps being touched, when a swiping operation of throwing the touched image to the outside of the liquid crystal display P has been performed, the option image display portion 11 makes disappear one group of option images corresponding to a function corresponding to the touched function image. Then, the option image display portion 11 displays a predetermined number of option images as one group among one set of option images corresponding to another function excluding the above function. Thus, the option image display portion 11 is capable of displaying one set of option images corresponding to every function.

Similarly, the predetermined image number is not limited to three as shown in FIG. 4, but may be one or may be four or more, for example. The predetermined image number is set as a design matter in advance in accordance with the screen size of the liquid crystal display P, and is stored in the ROM or the like.

For example, options that can be the setting content of the reduction/expansion function include "automatic", "100%", "scale input", "A4→B4", "B4→A4", and the like. Thus, the number of options that can be the setting content of a function may exceed the predetermined image number described above.

In this case, for example, as shown in FIG. 4, while the option image G33 displayed at the lowermost position of the group G3 keeps being touched, when a swiping operation has been performed downward in the vertical direction D1, the option image display portion 11 shifts the display positions of the option images G31 and G32 that are not touched, by one stage, downward in the vertical direction D1.

Then, the option image display portion 11 displays, at the display position of the uppermost option image of the group G3, an option image that has not been displayed (for example, an option image corresponding to an option "B4→A4"), among the one set of option images corresponding to the reduction/expansion function.

On the other hand, while the option image G31 displayed at the uppermost position of the group G3 keeps being touched, when a swiping operation has been performed upward in the vertical direction D1, the option image display portion 11 shifts the display positions of the option images G32 and G33 that are not touched, by one stage, upward in the vertical direction D1. Then, the option image display portion 11 displays, at the display position of the lowermost option image of the group G3, an option image that has not been displayed (for example, an option image corresponding to an option "A4→B4"), among the one set of option images corresponding to the reduction/expansion function. Thus, the option image display portion 11 is capable of displaying every image included in one set of option images corresponding to each function.

Figure 6A:
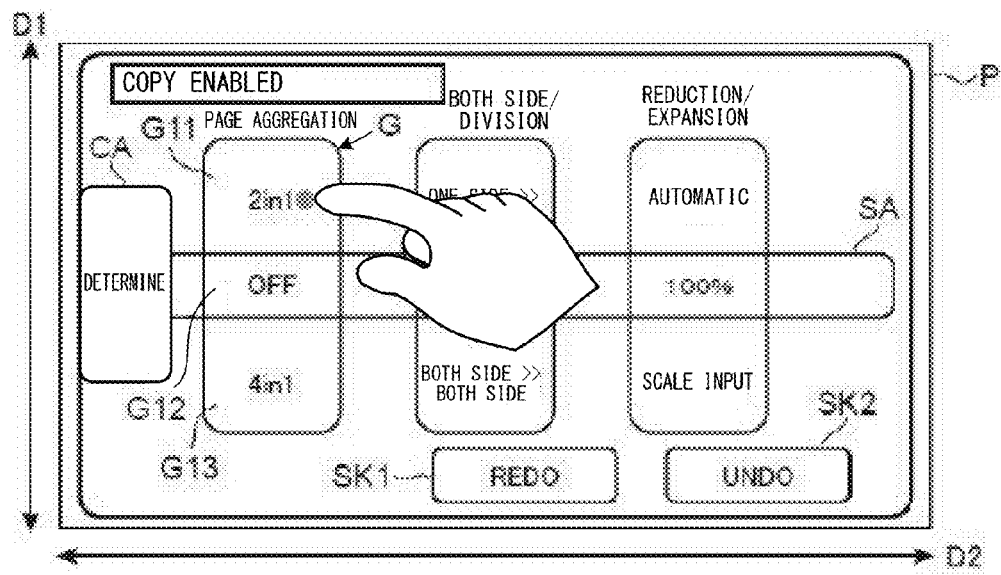
FIG. 6A is an explanation diagram showing an example of a selecting operation, according to the embodiment of the present disclosure.
Figure 6B:
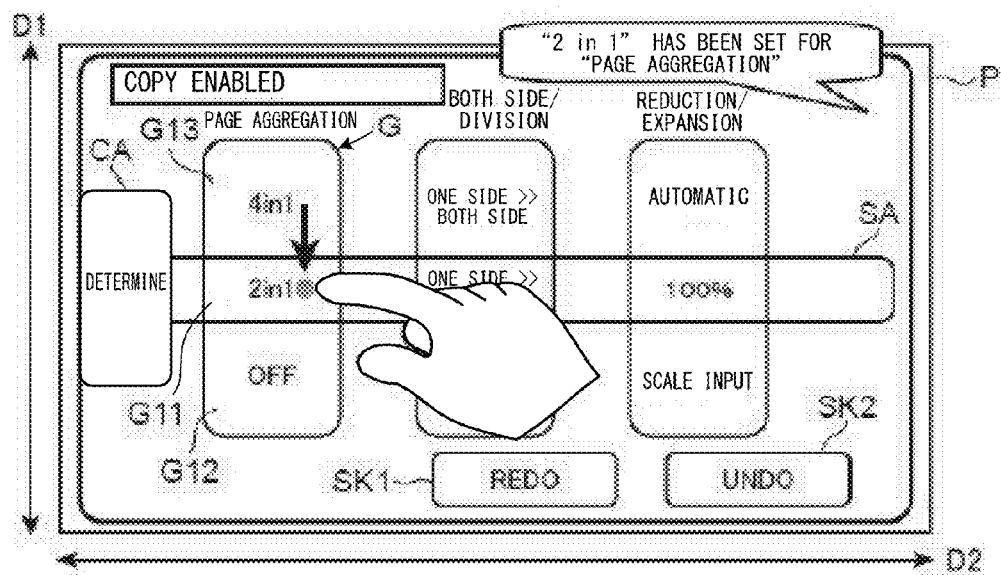
FIG. 6B is an explanation diagram showing an example of a selecting operation, according to the embodiment of the present disclosure.

FIG. 6 is an explanation diagram showing an example of a selecting operation. For example, as shown in FIG. 6A, while the option image G11 corresponding to an option "2 in 1" keeps being touched, as shown in FIG. 6B, when a swiping operation of moving the option image G11 to a selection area SA provided being elongated in the horizontal direction D2 has been performed, the selecting operation accepting portion 12 accepts a selecting operation of selecting the option image G11 (S3; YES).

Thus, since a swiping operation can be performed, a user can perform a selecting operation by, while keeping touching an option image to be selected, performing a swiping operation of moving the touched option image in the vertical direction D1 to the selection area SA. Therefore, the user can perform the selecting operation with a unified operation feeling that is the same as in the determining operation, in which a selected object is moved in a certain direction. Therefore, as compared to the case where the input operation methods for the setting contents are different among functions, a user's labor for memorizing the input operation methods is reduced, thus providing a preferable effect for the user.

When the selecting operation accepting portion 12 has accepted the selecting operation (S3; YES), for example, as shown in a balloon at the upper right in FIG. 6B, the selection notifying portion 13 causes the speaker 78 to output a sound representing a sentence indicating that the setting content of the page aggregation function has been set at "2 in 1", by combining the option "2 in 1" corresponding to the option image "2 in 1" selected by the selecting operation with the page aggregation function to be set by the selected option (S4). That is, the selection notifying portion 13 notifies a user that the option set as the setting content of the function has been changed. It is noted that sound signals corresponding to sentences to be outputted by the speaker 78 are stored in the ROM or the like in advance.

Thus, the user can recognize that a different option has been selected, by a sound, every time a selecting operation is accepted. Therefore, even if the user has performed a selecting operation carelessly, the user is likely to be aware of the careless operation.

Figure 7A:
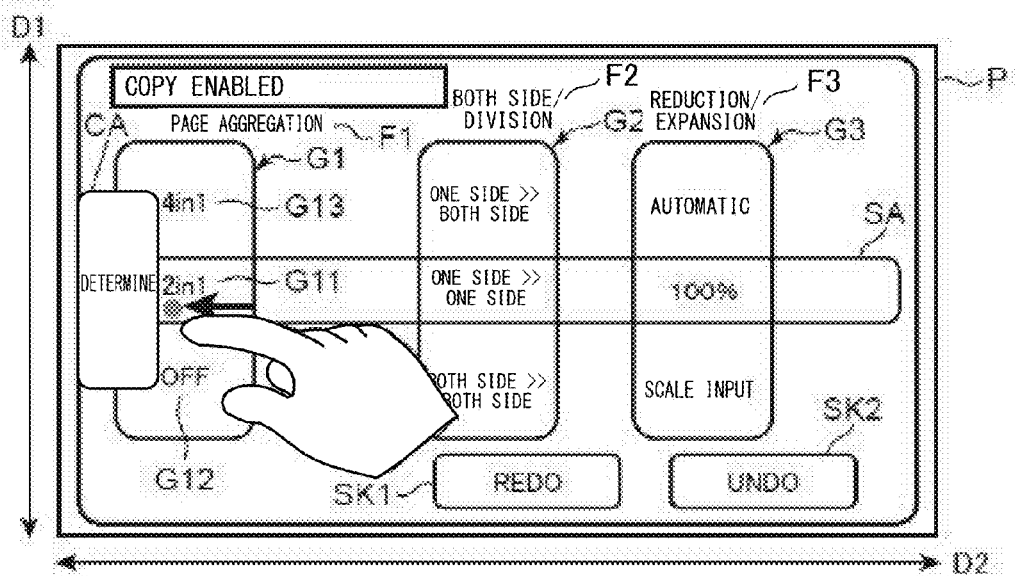
FIG. 7A is an explanation diagram showing an example of a determining operation, according to the embodiment of the present disclosure.
Figure 7B:
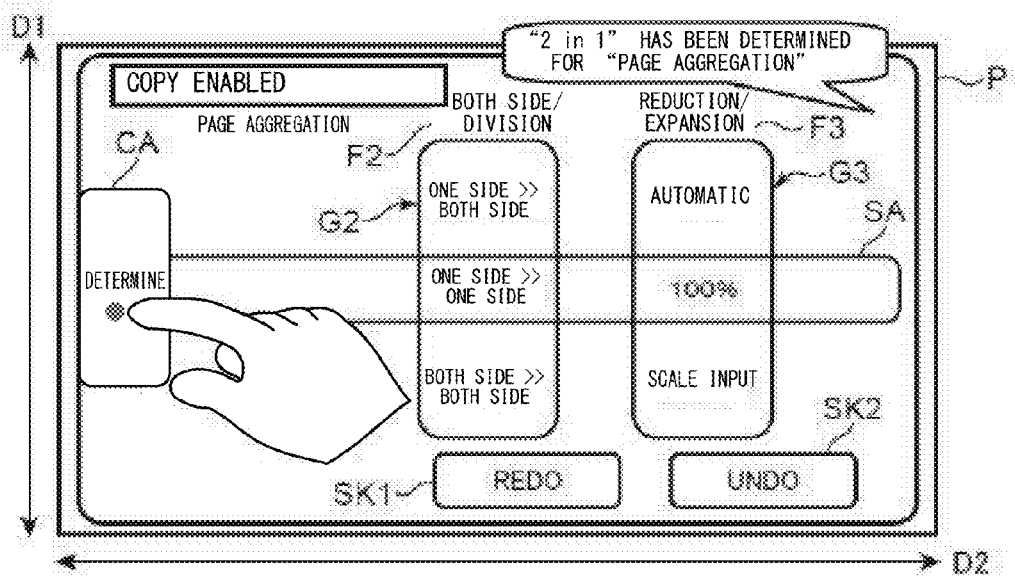
FIG. 7B is an explanation diagram showing an example of a determining operation, according to the embodiment of the present disclosure.

FIG. 7 is an explanation diagram showing an example of a determining operation. As shown in FIG. 7A, while the option image G11 selected by the selecting operation keeps being touched, as shown in FIG. 7B, when a swiping operation of moving the option image G11 from the position where the group G1 is displayed to the determination area CA provided separately from the position in the horizontal direction D2 has been performed, the determining operation accepting portion 14 accepts a determining operation of determining the option "2 in 1" corresponding to the touched option image G11, as the setting content of the page aggregation function (S5; YES).

When the determining operation accepting portion 14 has accepted the determining operation (S5; YES), the function setting determining portion 15 stores, into the RAM or the like, information indicating the option "2 in 1" corresponding to the option image G11 moved to the determination area CA by the determining operation, so as to be associated with information indicating the page aggregation function corresponding to the option "2 in 1", thereby determining the setting content of the page aggregation function to be the option "2 in 1" (S6, determination processing).

When the determination processing (S6) has been performed, for example, as shown in a balloon at the upper right in FIG. 7B, the determination notifying portion 16 causes the speaker 78 to output a sound representing a sentence indicating that the setting content of the page aggregation function has been determined to be "2 in 1", by combining the page aggregation function whose setting content has been determined by the determination processing, with the option "2 in 1" corresponding to the determined setting content (S7).

Thus, the user can recognize that determination processing has been performed, by a sound, every time determination processing is performed. Therefore, even if the user has performed a determining operation carelessly and determination processing has been performed, the user is likely to be aware of the careless operation.

Thus, the option image display portion 11 causes the liquid crystal display P to display a plurality of groups respectively corresponding to a predetermined number of functions, so as to be arranged along two directions of the vertical direction D1 and the horizontal direction D2. Therefore, a user just performs repeatedly: a selecting operation of selecting an option image corresponding to a desired setting content among a plurality of option images arranged in the vertical direction D1; and a determining operation of moving the selected option image in the horizontal direction D2, whereby the user can determine the respective setting contents of a predetermined number of functions (for example, three functions) for which respective sets of option images corresponding to the liquid crystal display P are displayed. That is, the user repeatedly performs two operations with a unified operation feeling in which a hand is moved in a certain direction, whereby the user can determine the setting contents of a predetermined number of functions. Therefore, as compared to the case where the input operation methods for the setting contents are different among functions, botheration for performing an input operation of the setting content of a function is reduced, thus providing a preferable effect for the user.

In addition, since the operation directions are limited to two directions of the vertical direction D1 and the horizontal direction D2 on the screen, a user does not need to perform complicated operations of moving the hand in multiple directions on the screen. Therefore, even if a user is not used to the input operation, the user can easily perform and memorize operations, and the labor for input operations is reduced.

In addition, when the determination processing (S6) has been performed, the option image display portion 11 performs post-determination processing of making disappear the one set of option images corresponding to the function whose setting content has been determined by the determining processing, and causing the liquid crystal display P to display respective sets of option images corresponding to other functions excluding the function whose setting content has been determined, so as to be arranged along the horizontal direction D2 (S8).

Thus, since the post-determination processing (S7) is performed, a user just performs repeatedly, on the same screen: a selecting operation of selecting an option image corresponding to a desired setting content among a plurality of option images arranged in the vertical direction D1; and a determining operation of moving the selected option image in the horizontal direction D2, whereby the user can determine the respective setting contents of a plurality of functions. That is, as compared to the case where input operations of the setting contents of a plurality of functions are performed by using a plurality of screens different among the functions, botheration for performing input operations of the setting contents of a plurality of functions is reduced, thus providing a preferable effect for the user.

Figure 8:
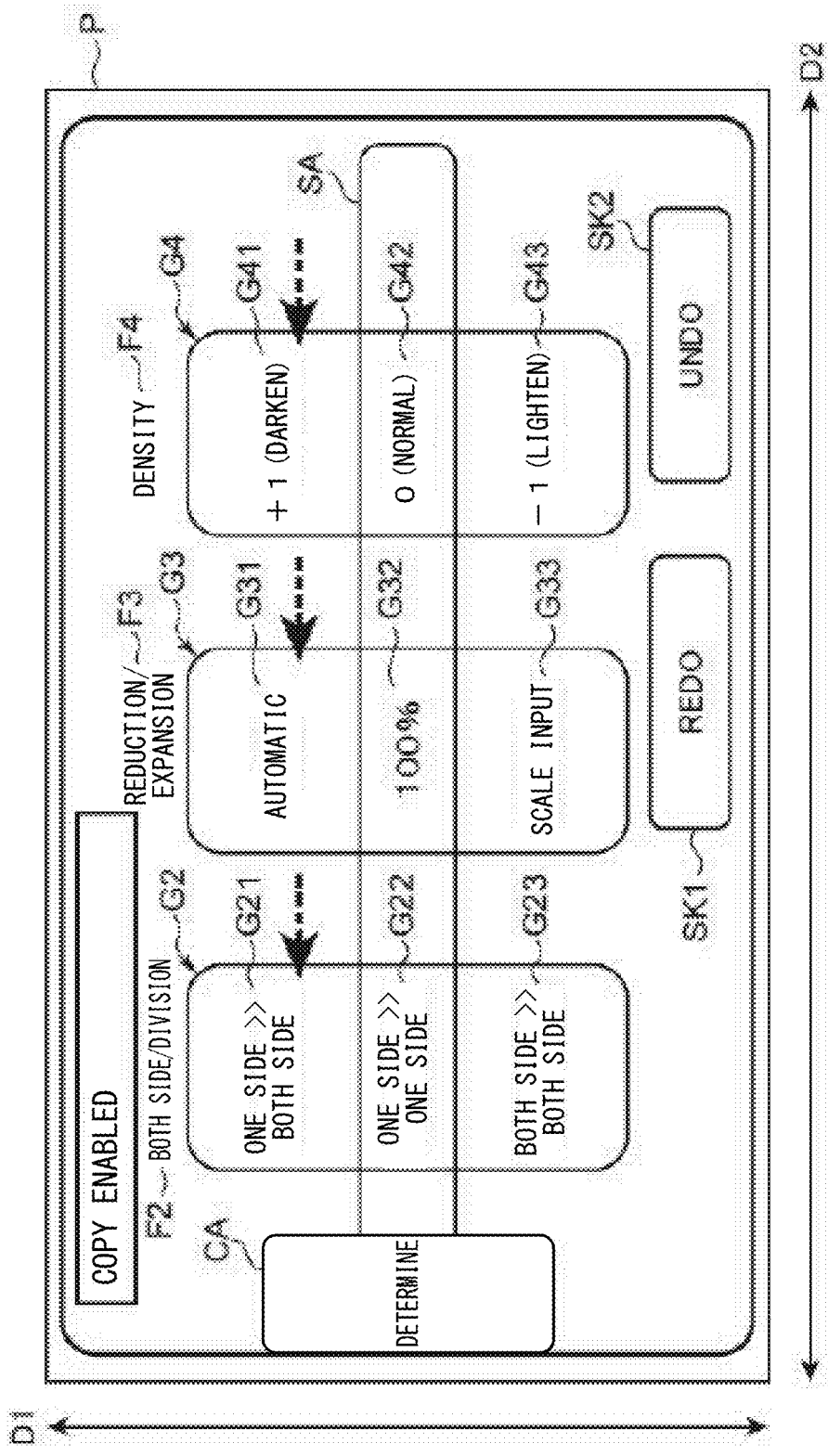
FIG. 8 is an explanation diagram showing an example of an operation screen displayed after post-determination processing is performed, according to the embodiment of the present disclosure.

FIG. 8 is an explanation diagram showing an example of an operation screen displayed after the post-determination processing is performed. For example, as shown in FIG. 7, when the determination processing of determining the setting content of the page aggregation function to be the option "2 in 1" has been performed (S6), the option image display portion 11 starts the post-determination processing, thereby making disappear the group G1 and the function image F1 corresponding to the page aggregation function whose setting content has been determined, as shown in FIG. 7B, for example. Then, for example, as shown in FIG. 8, the option image display portion 11 shifts, by one group, leftward in the horizontal direction D2, the display positions of the group G2 and the function image F2 corresponding to the both side/division function, and the display positions of the group G3 and the function image F3 corresponding to the reduction/expansion function.

Then, the option image display portion 11 treats, as one set, a plurality of option images respectively corresponding to a plurality of options that can be the setting content of, for example, the density function which is another function excluding the page aggregation function among a plurality of functions whose setting contents can be inputted for executing the copy function. Then, the option image display portion 11 sets three option images G41 to G43 as one group G4 among the one set of option images, and then displays the three groups G2, G3, and G4 so as to be arranged along the horizontal direction D2.

Next, the whole prohibition processing portion 17 performs whole prohibition processing (S9, S10) of prohibiting displaying, on the liquid crystal display P, one set of option images corresponding to a function prohibited from being executed in combination with the function whose setting content has been determined by the determination processing (S6).

FIG. 9 is an explanation diagram showing an example of a determination operating performed before the whole prohibition processing is performed by the whole prohibition processing portion 17. It is noted that for the whole prohibition processing portion 17 to perform the whole prohibition processing, information indicating combinations of functions prohibited from being executed in combination with each other among a plurality of functions to be executed by the control portion 10 is stored in the ROM or the like in advance.

Figure 9A:
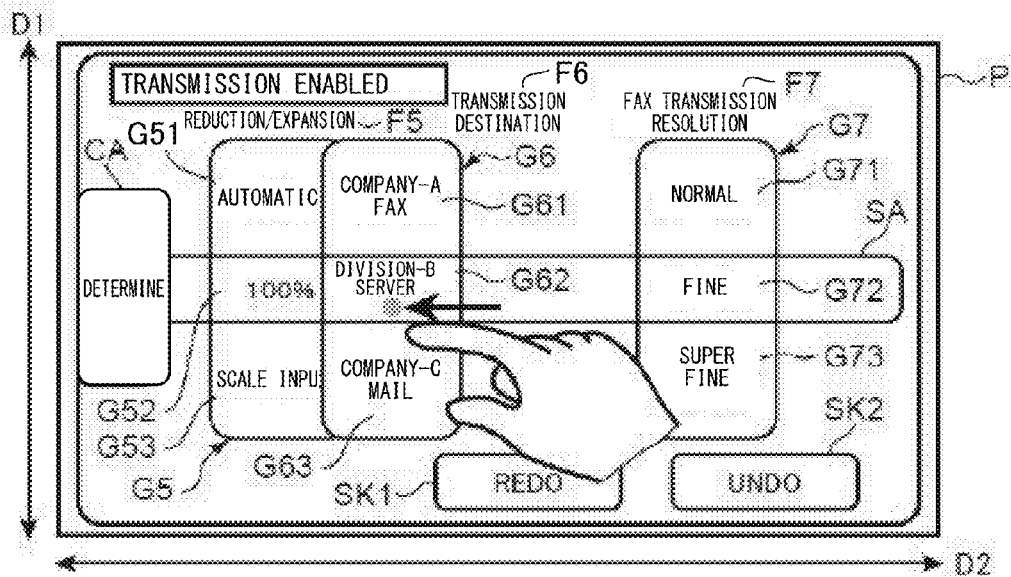
FIG. 9A is an explanation diagram showing an example of a determining operation performed before whole prohibition processing is performed, according to the embodiment of the present disclosure.
Figure 9B:
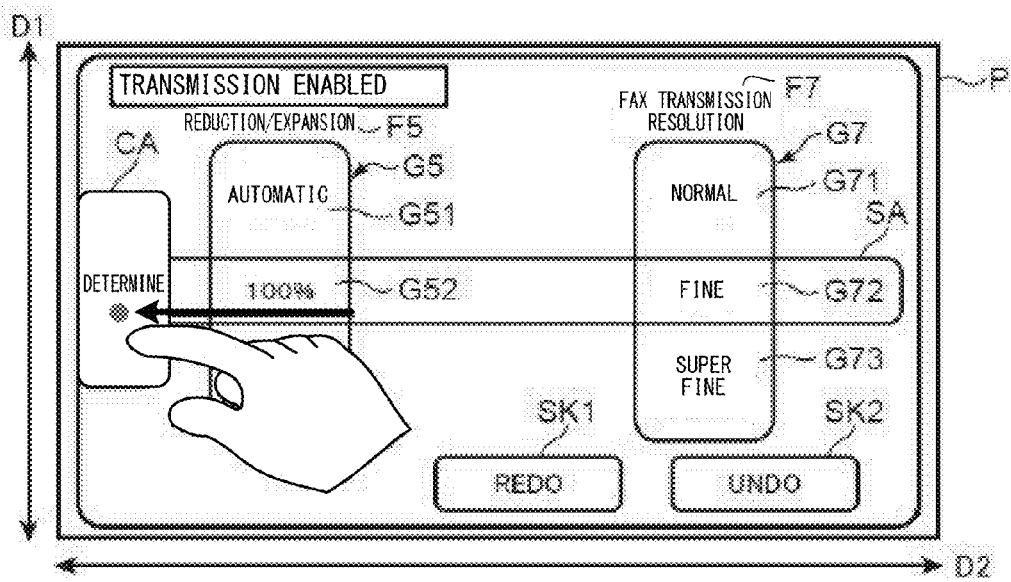
FIG. 9B is an explanation diagram showing an example of a determining operation performed before the whole prohibition processing is performed, according to the embodiment of the present disclosure.

For example, FIG. 9A shows an operation screen displayed by the option image display portion 11, for performing an input operation of each setting content of three functions of the reduction/expansion function, a transmission destination function, and a FAX transmission resolution function, in the case of executing the transmission function. Thus, in the case where groups G5, G6, and G7 of option images, respectively corresponding to the three functions, are displayed on the liquid crystal display P (S2), as shown in FIG. 9B, while an option image G62 corresponding to the transmission destination function keeps being touched, when a swiping operation is performed to move the option image G62 to the determination area CA, a determining operation is accepted (S5; YES). Then, the determination processing is performed (S6), thereby determining an option "division B server" corresponding to the option image G62, as the setting content of the transmission destination function. As a result, information indicating the option "division B server" is stored into the RAM or the like, so as to be associated with information indicating the transmission destination function.

It is noted that in the case where the setting content of the transmission destination function has been determined to be the "division B server", upon execution of the transmission function, the control portion 10 executes a network transmission function of transmitting image data read by the scanner portion 51 to the "division B server" via the network I/F portion 93. In addition, execution of the FAX transmission resolution function in combination of the network transmission function is prohibited in advance. Information indicating the combination of these functions is stored in the ROM or the like in advance.

Figure 10A:
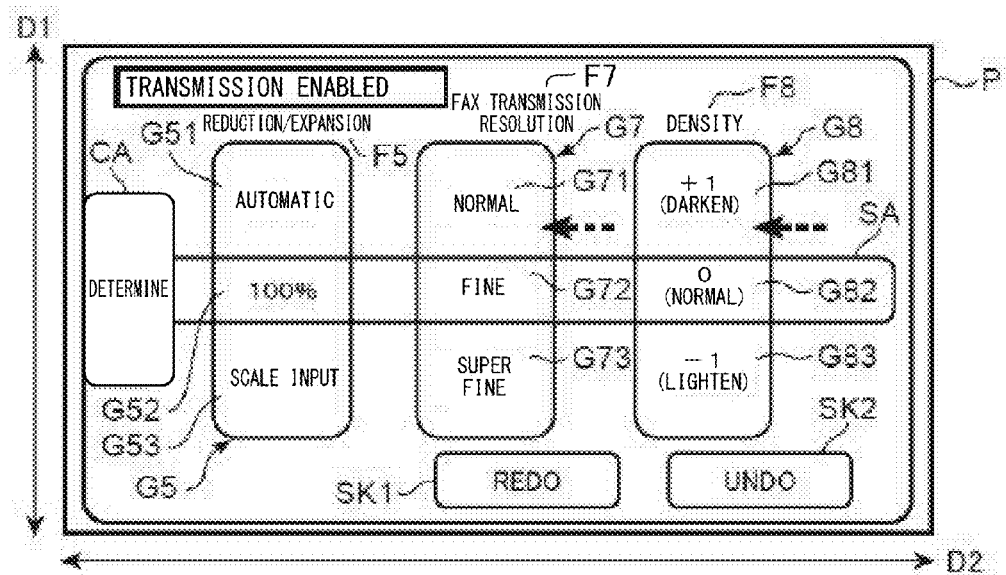
FIG. 10A is an explanation diagram showing an example of an operation screen displayed before and after the whole prohibition processing is performed, according to the embodiment of the present disclosure.

FIG. 10 is an explanation diagram showing an example of an operation screen displayed before and after the whole prohibition processing is performed. After the determining operation shown in FIG. 9B has been accepted and then the determination processing has been performed, the option image display portion 11 executes post-determination processing, thereby displaying groups G5, G7, and G8 of option images, respectively corresponding to three functions of the reduction/expansion function, the FAX transmission resolution function, and the density function which are other functions excluding the transmission destination function among the detailed functions relevant to the transmission function, so as to be arranged in the horizontal direction D2, as shown in FIG. 10A, for example.

In this case, by using the above information indicating the combination of the functions stored in the ROM or the like in advance, the whole prohibition processing portion 17 determines that the above three functions for which option images corresponding to the liquid crystal display P are displayed include the FAX transmission resolution function which is prohibited from being executed in combination with the network transmission function which is executed in the case where the setting content of the transmission destination function is the "division B server" (S9; YES).

Figure 10B:
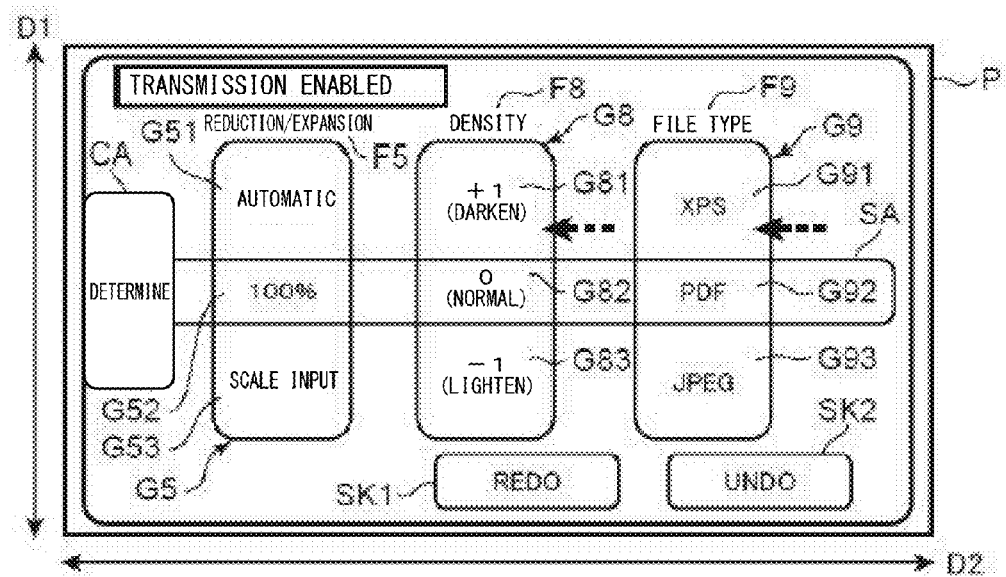
FIG. 10B is an explanation diagram showing an example of an operation screen displayed before and after the whole prohibition processing is performed, according to the embodiment of the present disclosure.

Then, for example, as shown in FIG. 10B, the whole prohibition processing portion 17 prohibits the option image display portion 11 from displaying one set of option images corresponding to the FAX transmission resolution function, and causes the option image display portion 11 to shift the display positions of the croup G8 and a function image F8 corresponding to the density function, by one group, leftward in the horizontal direction D2. Then, the whole prohibition processing portion 17 causes the option image display portion 11 to: treat, as one set, a plurality of option images corresponding to, for example, a file type function which is another function excluding the transmission destination function and the FAX transmission resolution function among the detailed functions relevant to the transmission function; treat, as one group G9, three option images G91 to G93 among the one set of option images; and displays three groups G5, G8, and G9 so as to be arranged in the horizontal direction D2 (S 10).

Thus, by performing the whole prohibition processing (S9, S10), an input operation of a setting content can be prevented from being performed for a function prohibited from being executed in combination with a function that has been already determined.

Returning to FIG. 5, the partial prohibition processing portion 18 performs partial prohibition processing (S11, S12) of causing the liquid crystal display P to display, among a plurality of option images, an option image corresponding to a setting content prohibited from being set in combination with the setting content determined by the determination processing (S6), in a display manner that allows the option image to be distinguished from option images corresponding to setting contents that are not prohibited from being set in combination with the setting content determined by the determination processing.

FIG. 11 is an explanation diagram showing an example of a determining operation performed before the partial prohibition processing portion 18 performs the partial prohibition processing. It is noted that for the partial prohibition processing portion 18 to perform the partial prohibition processing, information indicating combinations of setting contents prohibited from being set in combination with each other is stored in the ROM or the like in advance.

Figure 11A:
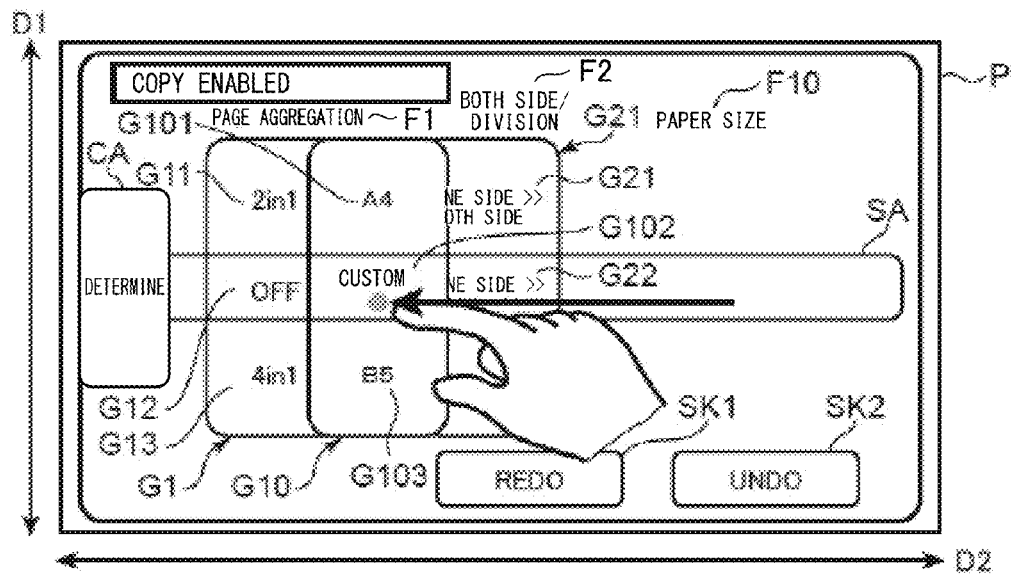
FIG. 11A is an explanation diagram showing an example of a determining operation performed before partial prohibition processing is performed by a partial prohibition processing portion, according to the embodiment of the present disclosure.
Figure 11B:
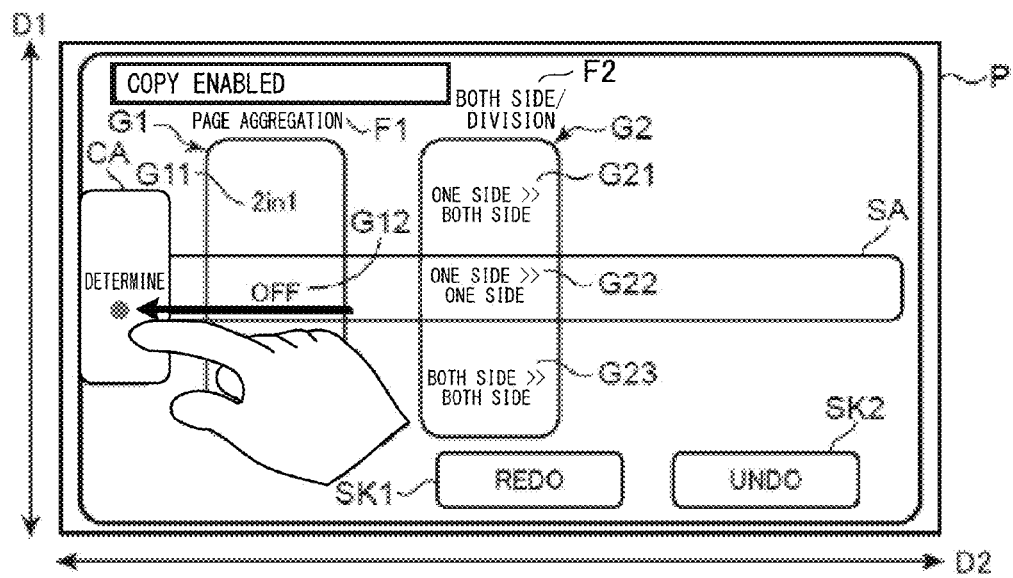
FIG. 11B is an explanation diagram showing an example of a determining operation performed before partial prohibition processing is performed by the partial prohibition processing portion, according to the embodiment of the present disclosure.

For example, FIG. 11A shows an operation screen displayed by the option image display portion 11, for performing an input operation of each of the setting contents of three functions of the page aggregation function, the both side/division function, and the sheet size function, in the case of executing the copy function. Thus, in the case where groups G1, G2, and G10 of option images, respectively corresponding to the three functions, are displayed on the liquid crystal display P (S2), as shown in FIG. 11B, while an option image G102 corresponding to the sheet size function keeps being touched, when a swiping operation is performed to move the option image G102 to the determination area CA, a determining operation is accepted (S5; YES). Then, the determination processing is performed (S6), thereby determining an option "custom" corresponding to the option image G102, as the setting content of the sheet size function. As a result, information indicating the option "custom" is stored into the RAM or the like, so as to be associated with information indicating the sheet size function.

It is noted that in the case where the setting content of the sheet size function has been determined to be "custom", upon execution of the copy function, the control portion 10 feeds, from the manual feed tray 462, a paper sheet with a size inputted by a user and stored in the RAM or the like in advance, and prints image data read by the scanner portion 51 on the paper sheet. In addition, it is prohibited in advance to set, for the setting content of the page aggregation function, any other option excluding the option "OFF" in combination with the setting content "custom" of the sheet size function. Information indicating the combination of these setting contents is stored in the ROM or the like in advance.

Figure 12A:
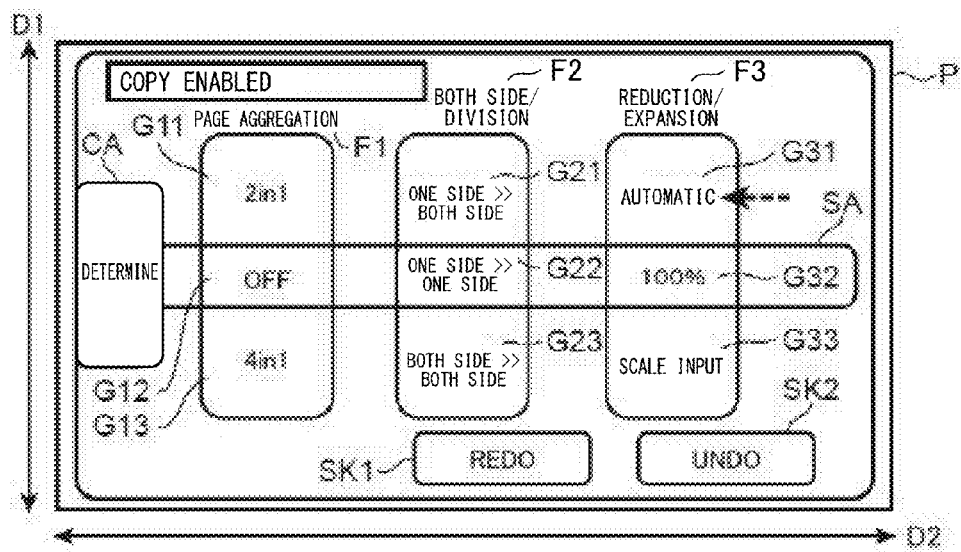
FIG. 12A is an explanation diagram showing an example of an operation screen displayed before and after the partial prohibition processing is performed, according to the embodiment of the present disclosure.

FIG. 12 is an explanation diagram showing an example of an operation screen displayed before and after the partial prohibition processing is performed. After the determining operation shown in FIG. 11B has been accepted and then the determination processing has been performed, the option image display portion 11 executes post-determination processing, thereby displaying groups G1, G2, and G3 of option images, respectively corresponding to three functions of the page aggregation function, the both side/division function, and the reduction/expansion function which are other functions excluding the sheet size function among the detailed functions relevant to the copy function, so as to be arranged in the horizontal direction D2, as shown in FIG. 12A, for example.

In this case, by using the above information indicating the combination of the setting contents stored in the ROM or the like in advance, the partial prohibition processing portion 18 determines that the option images displayed on the liquid crystal display P include the option images G11 and G13 corresponding to the options "2 in 1" and "4 in 1" which can be the setting content of the page aggregation function and which are prohibited from being set in combination with the setting content "custom" of the sheet size function (S11; YES).

Figure 12B:
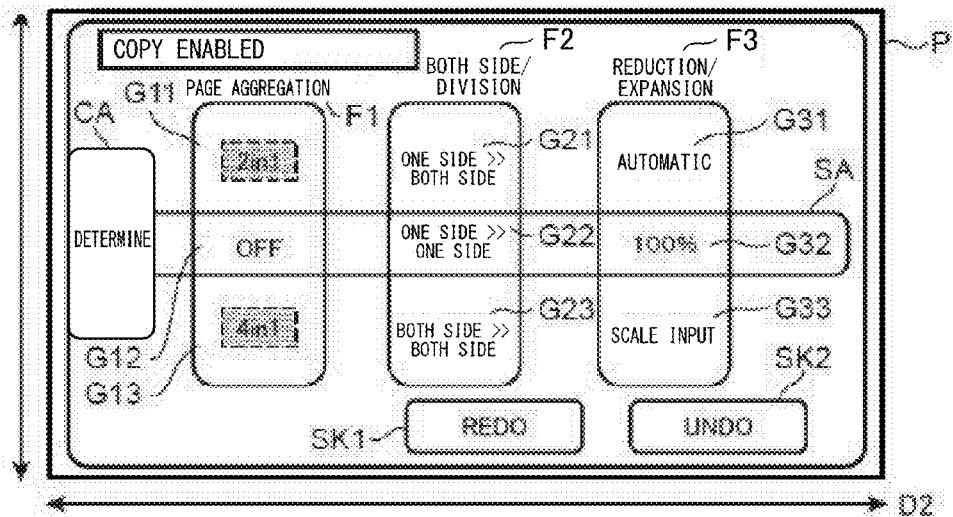
FIG. 12B is an explanation diagram showing an example of an operation screen displayed before and after the partial prohibition processing is performed, according to the embodiment of the present disclosure.

Then, for example, as shown in FIG. 12B, the partial prohibition processing portion 18 causes the option image display portion 11 to display the option images G11 and G13 corresponding to the above two setting contents by using a different background color from that of an option image G12 (S12). The option image G12 is an option image corresponding to a setting content "OFF" which is not prohibited from being set in combination with the setting content "custom" of the sheet size function. It is noted that, in addition to the display using the different background color, the partial prohibition processing portion 18 may prohibit the selecting operation accepting portion 12 from accepting a selecting operation of selecting the option images "2 in 1" and "4 in 1" corresponding to the above two setting contents.

Thus, by performing the partial prohibition processing (S11, S12), even if a user tries to input a setting content prohibited from being set in combination with a setting content that has been already determined, the user is likely to be aware of the prohibition. Thus, the possibility that an input operation might be performed for a setting content prohibited from being set in combination with a setting content that has been already determined, can be reduced.

Then, during a period when the start key 75 (FIG. 2) is not being pressed by a user (S13; NO), the process repeatedly returns to step S3. When the start key 75 (FIG. 2) has been pressed by a user (S13; YES), the control portion 10 executes each function by using the setting contents stored in the RAM or the like in step S6 (S14).

Next, the undo processing and the redo processing will be described in detail. For example, as shown in FIG. 7B, when a determining operation of determining the setting content of the page aggregation function to be "2 in 1" has been accepted (S5; YES), the determination processing (S6) and the post-determination processing (S7) are performed. By the post-determination processing, for example, as shown in FIG. 7B, one set of option images corresponding to the page aggregation function is made to disappear, and then, for example, as shown in FIG. 8, groups G2, G3, and G4 which are each composed of three option images and respectively correspond to the both side/division function, the reduction/expansion function, and the density function, are displayed.

In this case, when the undo key SK2 has been pressed by a user, the undo operation accepting portion 19 accepts an undo operation. When the undo operation accepting portion 19 has accepted the undo operation, the undo processing portion 20 performs undo processing of making disappear one set of option images corresponding to the density function which have been displayed by the post-determination processing after the determining processing performed just after the acceptance, and causing the liquid crystal display P to display again the group G1 of option images corresponding to the page aggregation function which has been made to disappear by the post-determination processing.

By performing the undo processing, the operation screen displayed on the liquid crystal display P returns to the state before the execution of the determination processing, in which the groups G1, G2, and G3 of option images corresponding to three functions of the page aggregation function, the both side/division function, and the reduction/expansion function are displayed as shown in FIG. 7A, for example. Thus, even if a user has performed a determining operation erroneously, the user can return the operation screen to the state before the last determining operation has been performed, by performing the undo operation.

In addition, after the undo operation accepting portion 19 has accepted the undo operation, when the redo key SK1 has been pressed by a user, the redo operation accepting portion 21 accepts a redo operation. When the redo operation accepting portion 21 has accepted the redo operation, the redo processing portion 22 performs redo processing of making disappear the one set of option images of the page aggregation function which have been displayed again by the undo processing just before the acceptance of the redo operation, and causing the liquid crystal display P to display again the group G4 of option images corresponding to the density function which has been made to disappear by the undo processing.

By performing the redo processing, the operation screen displayed on the liquid crystal display P returns to the state before the execution of the undo processing, in which the groups G2, G3, and G4 of option images corresponding to three functions of the both side/division function, the reduction/expansion function, and the density function are displayed as shown in FIG. 8, for example. Thus, even if a user has performed an undo operation erroneously, the user can return the operation screen to the state in which a determining operation cancelled by the erroneous undo operation has been performed again, by performing the redo operation. Thus, by performing a pressing operation of the redo key SK1 or the undo key SK2 displayed on the screen, which is easy for a user, the user can easily return the operation screen to the state before an erroneous determining operation or an erroneous undo operation has been performed, without performing any bothersome operation.

Thus, according to the configuration of the above embodiment, when the determining operation accepting portion 4 has accepted a determining operation (S5; YES), determination processing of determining, as the setting content of a function, an option corresponding to an option image moved to the determination area CA by the determining operation, is performed (S6), whereby the setting content of the function is determined. Therefore, a user performs a selecting operation of selecting an option image corresponding to a desired setting content among a plurality of option images arranged in the vertical direction D1, and performs a determining operation of moving the selected option image to the determination area CA, whereby the user can determine the setting content of a function to be a desired one. In addition, since the operation directions are limited to two directions of the vertical direction D1 and the horizontal direction D2 on the screen, a user does not need to perform complicated operations of moving the hand in multiple directions on the screen. Therefore, even users that are not used to input operations, such as an elderly person, a hearing-impaired person, and a user that rarely uses an image forming apparatus, can easily perform and memorize operations, and the labor for an input operation of the setting content of each function is reduced.

It is noted that the present disclosure is not limited to the configuration of the above embodiment, and may be modified in various manners. The configurations shown in FIGS. 1 to 12 in the above embodiment are merely examples, and not intended to limit the present disclosure to the above embodiment.

For example, in the above embodiment, it has been assumed that the vertical direction D1 of the liquid crystal display P is the first direction according to the present disclosure, and the horizontal direction D2 of the liquid crystal display P is the second direction according to the present disclosure. However, the present disclosure is not limited thereto. For example, in the case where the present disclosure is applied to an image forming apparatus including a liquid crystal display whose length in the vertical direction is longer than that in the horizontal direction, the horizontal direction of the liquid crystal display may be set as the first direction, and the vertical direction of the liquid crystal display may be set as the second direction.

Figure 13A:
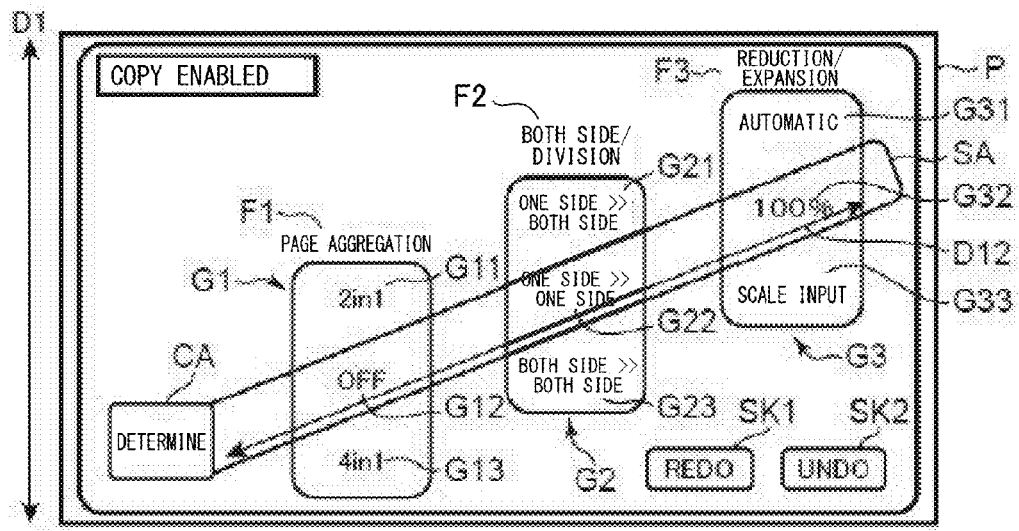
FIG. 13A is an explanation diagram showing another example of an operation screen different from FIG. 4, that allows a user to perform an input operation of the setting content of each function.
Figure 13B:
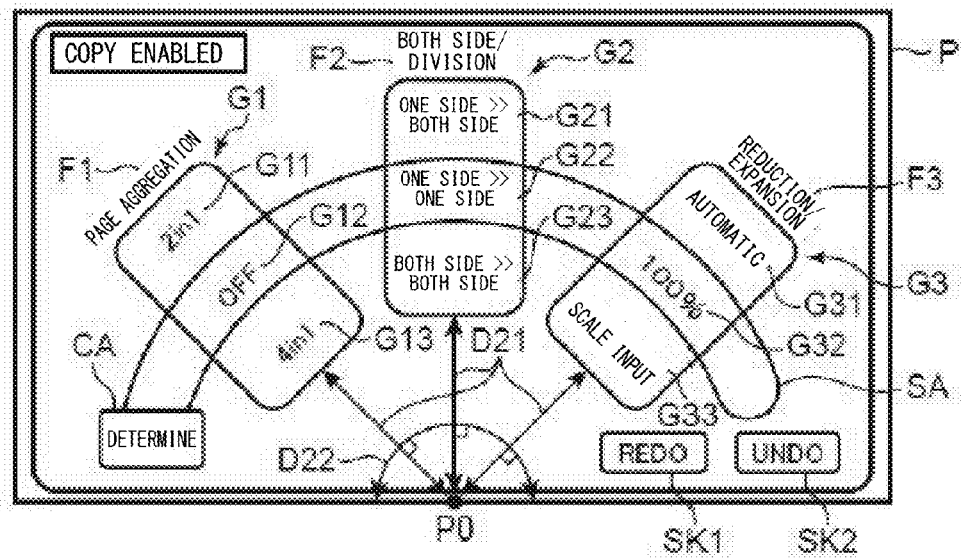
FIG. 13B is an explanation diagram showing still another example of an operation screen different from FIGS. 4 and 13A, that allows a user to perform an input operation of the setting content of each function.

The layout of the operation screen exemplified in FIG. 4 that allows a user to perform an input operation of the setting content of each function may be changed as shown in FIG. 13A. Then, the vertical direction D1 of the liquid crystal display P may be set as the first direction according to the present disclosure, and a diagonal direction D12 of the liquid crystal display P may be set as the second direction according to the present disclosure. Alternatively, the layout of the operation screen exemplified in FIG. 4 that allows a user to perform an input operation of the setting content of each function may be changed as shown in FIG. 13B. Then, an arc direction D22 centered at a point P0 on the liquid crystal display P may be set as the second direction according to the present disclosure, and a direction D21 perpendicular to the second direction (arc direction) may be set as the first direction according to the present disclosure.

The control portion 10 may not function as the undo operation accepting portion 19, the undo processing portion 20, the redo operation accepting portion 21, and the redo processing portion 22.

The control portion 10 may not function as the partial prohibition processing portion 18 so as not to execute the partial prohibition processing (S11, S12). The control portion 10 may not function as the whole prohibition processing portion 17 so as not to execute the whole prohibition processing (S9, S10).

The control portion 10 may not function as the determination notifying portion 16 so as not to execute step S7. The control portion 10 may not function as the selection notifying portion 13 so as not to execute step S4.

In the above embodiment, the option image display portion 11 causes the liquid crystal display P to display a predetermined number of option images as one group among one set of option images corresponding to each function. Instead, the number of option images to be displayed as one group may be different among functions, that is, for example, the option image display portion 11 may display, as one group, all the option images included in the one set corresponding to each function.

In the above embodiment, a selecting operation is performed by a swiping operation of, while keeping touching an option image to be selected, moving the option image to the selection area SA on the liquid crystal display P. The selecting operation is not limited thereto. For example, a selecting operation may be performed by touching an option image to be selected, and along with this, when the selecting operation accepting portion 12 has accepted the selecting operation, the option image display portion 11 may change the display manner of the touched and selected option image, by a method of, for example, changing the background color of the touched and selected option image to a different color from the background color of option images that are not selected.

In the above embodiment, the case where the image forming apparatus according to the present disclosure is the multifunction peripheral 1 has been described as an example. However, the image forming apparatus according to the present disclosure can be also applied to a facsimile device, a printer device, or a copy device, for example. In addition, in the above embodiment, the case where the electronic apparatus according to the present disclosure is applied to the touch panel device 71 and the control portion 10 has been described as an example. However, the electronic apparatus according to the present disclosure can be also applied to a scanner apparatus, a game apparatus, a mobile phone, or a car navigation apparatus, for example.

It is to be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An electronic apparatus comprising:
a display operation portion that includes a screen on which information is displayed, and that accepts a touching operation on the screen;
a control portion that executes a predetermined function;
an option image display portion that displays, on the screen, a function image indicating a detailed function relevant to the predetermined function, that treats, as one set, a plurality of option images corresponding to a plurality of options that can be the setting content of the detailed function, and that displays the one set of option images on the screen so as to be arranged along a first direction set in advance on the screen;
a selecting operation accepting portion that accepts a selecting operation of selecting one of the plurality of option images, the selecting operation being a swiping operation in the first direction of, while continuing to touch an option image to be selected, moving the option image to a selection area that is elongated in a second direction different from the first direction on the screen;
a determining operation accepting portion that accepts a determining operation, the determining operation being a swiping operation in the second direction of, while continuing to touch the option image selected by the selecting operation, moving the option image from a display position of the one set of option images to a determination area which is provided, on the screen, separately from all option images, the selection area intersecting with a display area on which the one set of option images is displayed by the option image display portion, the selection area extending in the second direction and intersecting with the determination area, and enabling the option image that has been moved to the selection area by the swiping operation in the first direction to be moved to the determination area via the selection area when the swiping operation in the second direction is performed; and a function setting determining portion that, when the determining operation accepting portion has accepted the determining operation, performs determination processing of determining, as the setting content of the detailed function, an option corresponding to the option image moved to the determination area by the determining operation.

2. The electronic apparatus according to claim 1, wherein the control portion is capable of executing a plurality of the detailed functions, and the option image display portion displays, on the screen, a plurality of sets of option images, respectively corresponding to a predetermined number of detailed functions among the plurality of detailed functions, so as to be arranged along the second direction.

3. The electronic apparatus according to claim 2, wherein the option image display portion, when the determination processing has been performed, performs post-determination processing of making disappear the one set of option images corresponding to the detailed function whose setting content has been determined by the determination processing, and displaying, on the screen, the sets of option images corresponding to other detailed functions excluding the detailed function whose setting content has been determined among the plurality of detailed functions, so as to be arranged along the second direction.

4. The electronic apparatus according to claim 2, further comprising a whole prohibition processing portion that prohibits displaying, on the screen, the one set of option images corresponding to a detailed function prohibited from being executed in combination with the detailed function whose setting content has been determined by the determination processing.

5. The electronic apparatus according to claim 2, further comprising a partial prohibition processing portion that displays, on the screen, among the plurality of option images, an option image corresponding to a setting content prohibited from being set in combination with the setting content determined by the determination processing, in a display manner that allows the option image to be distinguished from an option image corresponding to a setting content that is not prohibited from being set in combination with the setting content determined by the determination processing.

6. The electronic apparatus according to claim 2, wherein the option image display portion displays, on the screen, a predetermined number of option images among the one set of option images, so as to be arranged along the first direction.

7. The electronic apparatus according to claim 2, wherein the first direction is one of the vertical direction and the horizontal direction of the screen, and the second direction is one of the vertical direction and the horizontal direction of the screen, and is different from the first direction.

8. The electronic apparatus according to claim 3, further comprising:

an undo operation accepting portion that accepts an undo operation;

a redo operation accepting portion that accepts a redo operation;

an undo processing portion that, when the undo operation accepting portion has accepted the undo operation, performs undo processing of making disappear one set of option images displayed by the post-determination processing upon the determination processing performed just before the acceptance, and displaying again, on the screen, one set of option images which has been made to disappear by the post-determination processing; and a redo processing portion that, after the undo operation accepting portion has accepted the undo operation, when the redo operation accepting portion has accepted the redo operation, performs redo processing of making disappear one set of option images displayed again by the undo processing performed just before the acceptance of the redo operation, and displaying again, on the screen, one set of option images which has been made to disappear by the undo processing.

9. The electronic apparatus according to claim 8, further comprising a whole prohibition processing portion that prohibits displaying, on the screen, the one set of option images corresponding to a detailed function prohibited from being executed in combination with the detailed function whose setting content has been determined by the determination processing.

10. The electronic apparatus according to claim 9, further comprising a partial prohibition processing portion that displays, on the screen, among the plurality of option images, an option image corresponding to a setting content prohibited from being set in combination with the setting content determined by the determination processing, in a display manner that allows the option image to be distinguished from an option image corresponding to a setting content that is not prohibited from being set in combination with the setting content determined by the determination processing.

11. The electronic apparatus according to claim 1, further comprising a whole prohibition processing portion that prohibits displaying, on the screen, the one set of option images corresponding to a detailed function prohibited from being executed in combination with the detailed function whose setting content has been determined by the determination processing.

12. The electronic apparatus according to claim 1, further comprising a partial prohibition processing portion that displays, on the screen, among the plurality of option images, an option image corresponding to a setting content prohibited from being set in combination with the setting content determined by the determination processing, in a display manner that allows the option image to be distinguished from an option image corresponding to a setting content that is not prohibited from being set in combination with the setting content determined by the determination processing.

13. The electronic apparatus according to claim 1, wherein the option image display portion displays, on the screen, a predetermined number of option images among the one set of option images, so as to be arranged along the first direction.

14. The electronic apparatus according to claim 1, wherein
the first direction is one of the vertical direction and the horizontal direction of the screen, and
the second direction is one of the vertical direction and the horizontal direction of the screen, and is different from the first direction.

15. An image forming apparatus comprising:
an image forming portion that forms an image on a paper sheet;
a display operation portion that includes a screen on which information is displayed, and that accepts a touching operation on the screen;
a control portion that executes a predetermined function including a function of causing the image forming portion to form an image on a paper sheet;
an option image display portion that displays, on the screen, a function image indicating a detailed function relevant to the predetermined function, that treats, as one set, a plurality of option images corresponding to a plurality of options that can be the setting content of the detailed function, and that displays the one set of option images on the screen so as to be arranged along a first direction set in advance on the screen;
a selecting operation accepting portion that accepts a selecting operation of selecting one of the plurality of option images, the selecting operation being a swiping operation in the first direction of, while continuing to touch an option image to be selected, moving the option image to a selection area that is elongated in a second direction different from the first direction on the screen;
a determining operation accepting portion that accepts a determining operation, the determining operation being a swiping operation in the second direction of, while continuing to touch the option image selected by the selecting operation, moving the option image from a display position of the one set of option images to a determination area which is provided, on the screen, separately from all option images, the selection area intersecting with a display area on which the one set of option images is displayed by the option image display portion, the selection area extending in the second direction and intersecting with the determination area, and enabling the option image that has been moved to the selection area by the swiping operation in the first direction to be moved to the determination area via the selection area when the swiping operation in the second direction is performed; and
a function setting determining portion that, when the determining operation accepting portion has accepted the determining operation, performs determination processing of determining, as the setting content of the detailed function, an option corresponding to the option image moved to the determination area by the determining operation.

\* \* \* \* \*